(12) United States Patent
Li et al.

(10) Patent No.: US 11,133,531 B2
(45) Date of Patent: *Sep. 28, 2021

(54) LIQUID ELECTROLYTE FORMULATIONS WITH HIGH SALT CONTENT

(71) Applicant: Wildcat Discovery Technologies, Inc., San Diego, CA (US)

(72) Inventors: Bin Li, San Diego, CA (US); Marissa Caldwell, Minneapolis, MN (US); Prabhakar Tamirisa, Brooklyn Park, MN (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 15/472,938

(22) Filed: Mar. 29, 2017

(65) Prior Publication Data
US 2017/0288270 A1   Oct. 5, 2017

Related U.S. Application Data

(60) Provisional application No. 62/315,582, filed on Mar. 30, 2016.

(51) Int. Cl.
| | |
|---|---|
| H01M 6/16 | (2006.01) |
| H01M 6/04 | (2006.01) |
| H01M 10/32 | (2006.01) |
| H01M 4/13 | (2010.01) |
| H01M 4/34 | (2006.01) |
| H01M 4/54 | (2006.01) |
| H01M 4/58 | (2010.01) |

(Continued)

(52) U.S. Cl.
CPC ... *H01M 10/0568* (2013.01); *H01M 10/0525* (2013.01); *H01M 10/0569* (2013.01); *H01M 2300/0028* (2013.01)

(58) Field of Classification Search
None
See application file for complete search history.

(56) References Cited

U.S. PATENT DOCUMENTS 9,985,318 B2 * 5/2018 Zhu ............... H01M 4/386
2004/0110068 A1 * 6/2004 Seki ............... H01M 2/021
429/326

(Continued)

OTHER PUBLICATIONS

Suo, Liumin et al., "A new class of Solvent-in-Salt electrolyte for high-energy rechargeable metallic lithium batteries" Nature Communications, Feb. 12, 2013, DOI:10.1038, pp. 1-9.

*Primary Examiner* — Cynthia H Kelly
*Assistant Examiner* — Julian Anthony
(74) *Attorney, Agent, or Firm* — The Small Patent Law Group LLC; Philip S. Hof (57) ABSTRACT

Electrolyte formulations including a high salt concentration. The electrolyte formulation includes an organic solvent and a lithium salt, wherein the lithium salt is mixed with the organic solvent at a concentration of at least 20 Mole %, or at least 40 Mole %, or at least 50 Mole %. The organic solvent includes N-methyl-2-pyrrolidone, butylene carbonate, butyl propionate, pentyl acetate, γ-caprolactone, propylene glycol sulfite, ethyl methyl sulfone, butyl sulfoxide or combinations thereof. The lithium salt includes lithium bis(trifluoromethane sulfonyl) imide, lithium tetrafluoroborate, or lithium hexafluorophosphate.

20 Claims, 5 Drawing Sheets (51) Int. Cl.
    *H01M 10/0568*     (2010.01)
    *H01M 10/0525*     (2010.01)
    *H01M 10/0569*     (2010.01)

(56) References Cited

U.S. PATENT DOCUMENTS

| | | |
|---|---|---|
| 2006/0194119 A1 | 8/2006 | Son et al. |
| 2006/0257722 A1 | 11/2006 | Hilmi et al. |
| 2007/0065726 A1* | 3/2007 | Yumoto ............ H01M 10/0525 429/326 |
| 2007/0072075 A1* | 3/2007 | Gan ...................... H01M 4/366 429/209 |
| 2009/0325065 A1* | 12/2009 | Fujii ...................... H01M 4/04 429/199 |
| 2010/0209772 A1 | 8/2010 | Lee et al. |
| 2011/0159379 A1 | 6/2011 | Matsumoto et al. |
| 2015/0050563 A1* | 2/2015 | Yamada ............ H01M 10/0568 429/337 |
| 2015/0147662 A1 | 5/2015 | Park et al. |
| 2016/0372792 A1* | 12/2016 | Zhu ...................... H01M 4/386 |

\* cited by examiner

LIQUID ELECTROLYTE FORMULATIONS WITH HIGH SALT CONTENT

BACKGROUND OF THE INVENTION

The present invention is in the field of battery technology and, more particularly, electrolyte formulations with comparatively low volatility.

Lithium ion batteries enjoy relatively widespread use, but to some extent their use is limited by the properties of existing lithium ion technology. For example, the electrolyte composition of conventional electrolyte solutions can be relatively volatile. This volatility poses a flammability risk. Certain packaging configurations have been designed to mitigate this risk, but the flammability risk prevents the use of lithium ion batteries in some applications.

The issue of electrolyte solvent volatility arises primarily from the use of volatile organic solvents in the electrolyte formulation. Specifically, the types of carbonate solvents chosen for their ionic and electronic conduction properties are solvents with relatively low boiling points.

These volatile solvents present a challenge to the high temperature use and high temperature storage of lithium ion batteries. The volatility of the solvents can diminish the cycle life of batteries under any circumstances, but in particular in high temperature environments.

These and other challenges can be addressed by certain embodiments of the invention described herein.

BRIEF SUMMARY OF THE INVENTION

Embodiments of the present invention are nonvolatile electrolyte formulations including a high salt concentration. The electrolyte formulation includes an organic solvent and a lithium salt, wherein the lithium salt is mixed with the organic solvent at a concentration of at least 20 Mole %, or at least 40 Mole %, or at least 50 Mole %. The organic solvent includes N-methyl-2-pyrrolidone, butylene carbonate, butyl propionate, pentyl acetate, γ-caprolactone, propylene glycol sulfite, ethyl methyl sulfone, butyl sulfoxide or combinations thereof. The lithium salt includes lithium bis(trifluoromethane sulfonyl) imide, lithium tetrafluoroborate, or lithium hexafluorophosphate.

Embodiments of the present invention include the methods of making such electrolyte formulations using the salts and solvents disclosed herein, the methods of forming batteries including such electrolyte formulations, and using batteries including such electrolyte formulations.

DETAILED DESCRIPTION OF THE INVENTION

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

Ranges presented herein are inclusive of their endpoints. Thus, for example, the range 1 to 3 includes the values 1 and 3 as well as the intermediate values.

The embodiments disclosed herein are electrolyte formulations that address the challenges associated with volatile solvents in lithium ion batteries. The inventive formulations are show high conductivity, good electrochemical performance in both primary and secondary battery chemistries and also have reduced volatility.

A lithium ion battery formed in accordance with embodiments of the invention includes an anode, a cathode, and a separator that is disposed between the anode and the cathode. The battery also includes an electrolyte formulation with low volatility, which is disposed between the anode and the cathode.

The liquid electrolyte solution facilitates the transport of lithium ions between electrodes in primary and secondary batteries and is therefore a critical component of lithium ion batteries. Conventional and widely used electrolyte formulations include a lithium salt, such as lithium hexafluorophosphate ($LiPF_6$), in an organic solution composed of one or more organic solvents. The specific electrolyte formulation will vary depending on the specific anode and cathode materials being used. The typical concentration of the lithium salt in the solution is about 1 molar (M), normally ranging from 0.8 to 1.5 molar. High salt concentration typically increases electrolyte viscosity resulting in slower diffusion of lithium ions and reduced ionic conductivity.

High salt concentration also results in stronger ion interactions as there are fewer solvent molecules to solvate the ions. This also impedes fast lithium ion transport.

To provide the performance improvements disclosed herein over 700 different electrolyte formulations were screened, with many of them showing good ionic conductivity and lower volatility than conventional electrolyte formulations when subjected to conductivity testing. However, few of the 700 electrolyte formulations demonstrated desirable electrochemical performance in a battery cell. Further, it was not predictable, from chemical structure or concentration, for example, which of the 700 would demonstrate good ionic conductivity in the conductivity test cell. And, of those electrolyte formulations that showed good ionic conductivity, it was not predictable which of those electrolyte formulations would demonstrate desirable electrochemical performance in a battery cell.

All of the electrolyte formulations that demonstrate desirable electrochemical performance in a battery cell have a substantially higher salt content than typical lithium ion electrolyte formulations. The increased salt content reduces the volatility of the electrolyte formulation, while specific salt-solvent combinations enable desirable electrochemical performance in battery cells.

Examples of suitable cathode materials include phosphates, fluorophosphates, fluorosulfates, fluorosilicates, spinels, layered oxides, lithium-rich layered oxides, and composite layered oxides. Further examples of suitable cathode materials include: spinel structure lithium metal oxides, layered structure lithium metal oxides, lithium-rich layered structured lithium metal oxides, lithium metal silicates, lithium metal phosphates, metal fluorides, metal oxides, sulfur, and metal sulfides.

Examples of suitable anode materials include conventional anode materials used in lithium ion batteries, such as lithium, graphite ($Li_xC_6$), and other carbon, silicon, or oxide-based anode materials.

Examples of suitable salts include lithium-containing salts for use in lithium ion batteries, such as lithium hexafluoroarsenate ($LiAsF_6$), lithium tetrafluoroborate ($LiBF_4$), lithium perchlorate ($LiClO_4$), lithium iodide (LiI), lithium hexafluorophosphate ($LiPF_6$), lithium bis(trifluoromethane sulfonyl) imide ($LiN(CF_3SO_2)_2$) (also referred to herein as "LiTFSI"), lithium bis(oxalato)borate ($LiB(C_2O_4)_2$) (also referred to herein as "LiBOB"), lithium nitrate ($LiNO_3$), lithium triflate ($LiCF_3SO_3$), lithium fluoride (LiF), lithium hydroxide (LiOH), lithium carbonate ($Li_2CO_3$), lithium oxalate ($Li(CO_2)_2$, lithium methyl carbonate ($LiOCO_2CH_3$), lithium ethyl carbonate ($LiOCO_2C_2H_5$), lithium oxide ($Li_2O$), lithium methoxide ($LiOCH_3$), and dilithium ethylene glycol dicarbonate ($CH_2OCO_2Li_2$).

Of the above salts, the most preferred salts include lithium bis(trifluoromethane sulfonyl) imide, lithium tetrafluoroborate, and lithium hexafluorophosphate.

Examples of suitable solvents includes solvents having relatively low volatility and containing one or more of the following groups: amide, cyclic carbonate, ester, lactone, sulfite, sulfolane, carbonate, glyme ether, and combinations thereof. Examples of specific solvents include, but are not limited to: dimethyl acetamide, N-methyl acetamide, N-methyl-2-pyrrolidone, diethyl carbonate, dipropyl carbonate, butyl propionate, pentyl acetate, 1,2 diethoxyethane, butylene carbonate, ethylene carbonate, fluoroethylene carbonate, propylene carbonate, diethylene glycol dimethyl ether ("diglyme" or "G2"), triethylene glycol dimethyl ether ("triglyme" or "G3"), tetraethylene glycol dimethyl ether ("tetraglyme" or "G4"), poly(ethylene glycol) dimethyl ether, γ-butyrolactone, γ-caprolactone, γ-valerolactone, diethyl sulfite, propylene glycol sulfite, dimethyl sulfone, ethyl methyl sulfone, sulfolane, butyl sulfoxide, and combinations thereof.

Of the above solvents, the most preferred solvents include N-methyl-2-pyrrolidone (an example of a solvent containing an amide and represented by structure (a)):

(a)

Butylene carbonate (an example of a solvent containing a cyclic carbonate and represented by structure (b)):

(b)

butyl propionate (an example of a solvent containing an ester and represented by structure (c)):

(c)

pentyl acetate (an example of a solvent containing an ester and represented by structure (d)):

(d)

γ-caprolactone (an example of a solvent containing a lactone and represented by structure (e)):

(e)

propylene glycol sulfite (an example of a solvent containing a sulfite and represented by structure (f)

ethyl methyl sulfone (an example of a solvent containing a sulfone and represented by structure (g)):

and butyl sulfoxide (an example of a solvent containing a sulfoxide and represented by structure (h)):

The preferred solvent structures disclosed herein are understood to encompass routine chemical modifications to their chemical structure, where such routine chemical modifications do not substantially alter their conductivity, volatility, and/or utility.

Other suitable solvents and salts can be used to yield electrolyte formulations having low electronic conductivity, high lithium ion solubility, low viscosity, and other desirable characteristics.

The electrolyte formulations disclosed herein can be prepared using a variety of techniques, such as by mixing the organic solvent and the lithium salt, dispersing the salt within the organic solvent, dissolving the salt within the organic solvent, or otherwise placing these components in contact with one another. The lithium salt can be provided in a liquid form, a powdered form (or another solid form), or a combination thereof. The salt can be incorporated in the organic solvent prior to, during, or subsequent to battery assembly.

In certain embodiments of the invention, the lithium salt is present at an amount that is significantly higher than the amount of conventional electrolyte salt typically present in the electrolyte formulation of the electrochemical cell. The amount of salt can be expressed as a mole percent (Mole %) of the total content of the electrolyte formulation.

In certain embodiments of the invention, the concentration of lithium salt in the electrolyte formulation is greater than or equal to about 10 Mole %, greater than or equal to about 15 Mole %, greater than or equal to about 20 Mole %, greater than or equal to about 25 Mole %, greater than or equal to about 30 Mole %, greater than or equal to about 35 Mole %, greater than or equal to about 40 Mole %, greater than or equal to about 55 Mole %, or greater than or equal to about 50 Mole %. In preferred embodiments, the concentration of lithium salt in the electrolyte formulation is in the range of about 20 Mole % to about 50 Mole %. In preferred embodiments, the concentration of lithium salt in the electrolyte formulation is about 20 Mole %, about 40 Mole %, or about 50 Mole %.

The inventive electrolyte formulations also can provide desirable performance characteristics over a wide range of operational voltages between a rated cut-off voltage and a rated charge voltage. The batteries can be charged to the rated charge voltage while substantially retaining the performance characteristics specified above, such as in terms of coulombic efficiency, retention of specific capacity, retention of coulombic efficiency, and rate capability.

The following examples describe specific aspects of some embodiments of the invention to illustrate and provide a description for those of ordinary skill in the art. The examples should not be construed as limiting the invention, as the examples merely provide specific methodology and testing useful in understanding and practicing some embodiments of the invention.

EXAMPLES

Electrolyte Formulations. Electrolyte solutions were formulated in a high purity argon filled glove box (M-Braun, $O_2$ and humidity content <0.1 ppm) by adding selected amounts of salt to the chosen solvent and mixing by mechanical shaking. Mixing times were from about 6 to about 12 hours.

Volatility Measurements. Mass loss was calculated gravimetrically by weighing vessels with solvents, lithium salt/solvent complexes, or formulations before and after exposure to elevated temperature of 160 degrees Celsius under vacuum (□30 in Hg) for 4 hours. For salts with decomposition temperature less than 180 degrees Celsius, 37 degrees Celsius was used for evaluation instead of 160 degrees Celsius. The electrolyte exposed surface area to volume ratio was kept constant. All materials were prepared under argon prior to volatility testing to avoid moisture pickup prior to the measurement. The gravimetric method was able to distinguish differences in weight loss for varying formulations with good reproducibility.

Primary Battery Cell Assembly. Primary battery cells were formed in a high purity argon filled glove box (M-Braun, $O_2$ and humidity content <0.1 ppm). Carbon fluoride (CFx)/silver vanadium oxide (SVO) hybrid cathodes (37 weight percent CFx, 53 weight percent SVO, 6 weight percent poly(tetrafluoroethylene) (PTFE), and 4 weight percent carbon black (Super P Li, TIMCAL) and lithium metal anodes were punched to the appropriate diameters. Electrolyte components were formulated and added to the battery cell. Each cell contained the composite cathode, a polypropylene separator, electrolyte, and lithium foil anode assembled in a CR2032 coin cell. The battery cell was sealed and discharged at 37 degrees Celsius at C/100 down to 1.5V as the low voltage cutoff with periodic high current pulse sequences.

Secondary Battery Cell Assembly. Secondary battery cells were formed in a high purity argon filled glove box (M-Braun, $O_2$ and humidity content <0.1 ppm). For secondary chemistries, $LiCoO_2$ (LCO) cathode and lithium titanate oxide ($Li_4Ti_5O_{12}$) (LTO) anode films were punched to appropriate diameters. Each cell contained the cathode film, a polypropylene separator, electrolyte and anode film. The cells were sealed and cycled at 37 degrees Celsius for three cycles at a rate of C/24, with a constant voltage hold to C/100 on charge, and the cells were cycled at a rate of C/5 with a constant voltage hold to C/100 current (charge only) between 1.8 V and 2.7V.

Conductivity Cells. Test cells were formed in a high purity argon filled glove box (M-Braun, $O_2$ and humidity content <0.1 ppm). The electrolyte and separator were placed between stainless steel electrodes and sealed to assemble the cell stack. Ionic conductivity was measured via electrochemical impedance spectroscopy (EIS), between 1-1,000,000 Hz at 37 degrees Celsius.

Electrochemical impedance spectroscopy. EIS was used to measure ionic conductivity and relative impedance. Ionic conductivities of solid state electrolyte films were measured on blocking electrodes of stainless steel or on lithium. EIS was performed using a BioLogic VMP3 potentiostat, with conditions given as follows:
Potential (V) 0
Initial Frequency (Hz) 1 MHz
Final Frequency (Hz) 0.5 Hz
Amplitude (mV) 10
Wait Period 0.1
Measures/frequency 3
Points/decade 6

Ionic conductivity. Tests were performed using stainless steel blocking electrodes of known area with a fixed gap. An average cell constant was determined from cells using a KCl calibration solution of known conductivity using:

Conductivity=(cell constant*cos Θ)/Z

Mass Loss Calculations. Normalized mass loss was calculated relative to the mass loss of a control electrolyte formulation containing 50 mole percent LiTFSI in tetraglyme. The tested electrolytes were heated under vacuum for about 4 hours at either 160 degrees Celsius (FIG. 3) or 37 degrees Celsius (FIG. 4) and the total weight loss measured. The amount lost was first calculated to a weight loss percent by dividing by the initial weight of the solution. The normalized weight loss is defined as the weight loss percent of the sample minus the weight loss percent of a control electrolyte.

Area Specific Impedance. Initial area specific impedance (ASI) was measured after setting the target state of charge (SOC) by discharging the cell at rate of C/10 and then applying a 10 second pulse at a rate of 5C. In some cases, the pulse data sampling rate was 0.1 seconds. ASI was calculated from the initial voltage (Vi) prior to the pulse and the final voltage (Vf) at the end of the pulse according to Formula (1), where A is the cathode area and i is the current:

$$ASI(\Omega \cdot cm^2) = \frac{(V_i - V_f) \times A}{i} \quad (1)$$

Results

Table 1 lists electrolyte solutions formulated according to the methods disclosed herein. The electrolyte solutions contain far higher lithium salt concentrations than conventional electrolyte solutions. Table 1 summarizes the electrochemical performance of some of the most preferred salt and solvent combination disclosed herein. From left to right, the first column identifies the electrolyte composition with the salt component having the abbreviations used previously herein, and the solvent component having the following abbreviations: N-methyl-2-pyrrolidone (NMP), butylene carbonate (BC), butyl propionate (BP), pentyl acetate (PA), γ-caprolactone (γC), propylene glycol sulfite (PGS), ethyl methyl sulfone (EMS), and butyl sulfoxide (BS). The next three columns present the total capacity, average voltage, and measured power for testing of primary battery cells having CFx/SVO hybrid cathodes and lithium metal anodes. The next two columns present the area specific impedance recorded in battery cells according to the protocols described herein. The far right column presents the conductivity recorded in conductivity cells according to the protocols described herein.

TABLE 1

Electrolyte solutions and results of electrochemical characterization

| Composition | Total Capacity (mAh/g) | Average Voltage (V) | Power (mW, 2 mA/cm$^2$) | 0.1 s ASI (ohm*cm$^2$, 2 mA/cm$^2$) | ASI (ohm*cm$^2$, 2 mA/cm$^2$) | Conductivity (mS/cm) |
|---|---|---|---|---|---|---|
| LiTFSI/NMP 20 Mole % | 454 | 2.64 | 10.1 | 30 | 50 | 3.151 |
| LiTFSI/BC 40 Mole % | 471 | 2.35 | 8.2 | 85 | 131 | 0.144 |
| LiTFSI/BC 20 Mole % | 478 | 2.50 | 9.2 | 23 | 35 | 1.228 |
| LiBF$_4$/BC 20 Mole % | 483 | 2.38 | 8.5 | 112 | 139 | 0.997 |
| LiPF$_6$/BP 40 Mole % | 577 | 2.25 | 8.0 | 158 | 184 | 1.665 |
| LiPF$_6$/PA 40 Mole % | 554 | 2.01 | 6.9 | 682 | 849 | 1.018 |
| LiTFSI/γC 40 Mole % | 414 | 2.33 | 8.3 | 88 | 125 | 0.327 |
| LiPF$_6$/PGS 20 Mole % | 607 | 2.46 | 9.0 | 44 | 57 | 4.368 |
| LiTFSI/EMS 40 Mole % | 435 | 2.28 | 7.6 | 149 | 197 | 0.299 |
| LiPF$_6$/BS 20 Mole % | 447 | 2.33 | 8.1 | 225 | 209 | 1.221 |
| LiBF$_4$/BS 20 Mole % | 478 | 2.36 | 8.6 | 279 | 224 | 0.484 |
| LiTFSI/G4 50 Mol % (control) | 445 | 2.42 | 9.0 | 41 | 65 | 1.952 |
| LiTFSI/1,2 Diethoxyethane 40 Mol % | 453 | 2.52 | 9.3 | 72 | 427 | 4.831 |
| LiBF$_4$/G4, 40 Mol % | 460 | 2.57 | 9.5 | 95 | 1052 | 1.303 |

Several of the electrolyte formulations have notable values presented in Table 1. For example, 20 Mole % lithium bis(trifluoromethane sulfonyl) imide in N-methyl-2-pyrrolidone demonstrates desirable properties in all of the measurements, with the total capacity of 454 mAh/g being the only property that is not a substantial improvement compared to the control (LiTFSI/G4, 50 Mol %). In another example, 20 Mole % lithium bis(trifluoromethane sulfonyl) imide in [BC] demonstrates desirable properties in almost all measurements. The higher concentration of 40 Mole % lithium bis(trifluoromethane sulfonyl) imide in [BC] demonstrates desirable total capacity but does not have substantially improved performance in the other categories. Generally, all of the electrolyte formulations in Table 1 demonstrate substantially improved, or at least improved, total capacity with 40 Mole % lithium bis(trifluoromethane sulfonyl) imide in γ-caprolactone being the sole exception. Another substantially improved formulation is 20 Mole % lithium hexafluorophosphate in propylene glycol sulfite.

Figure 1:
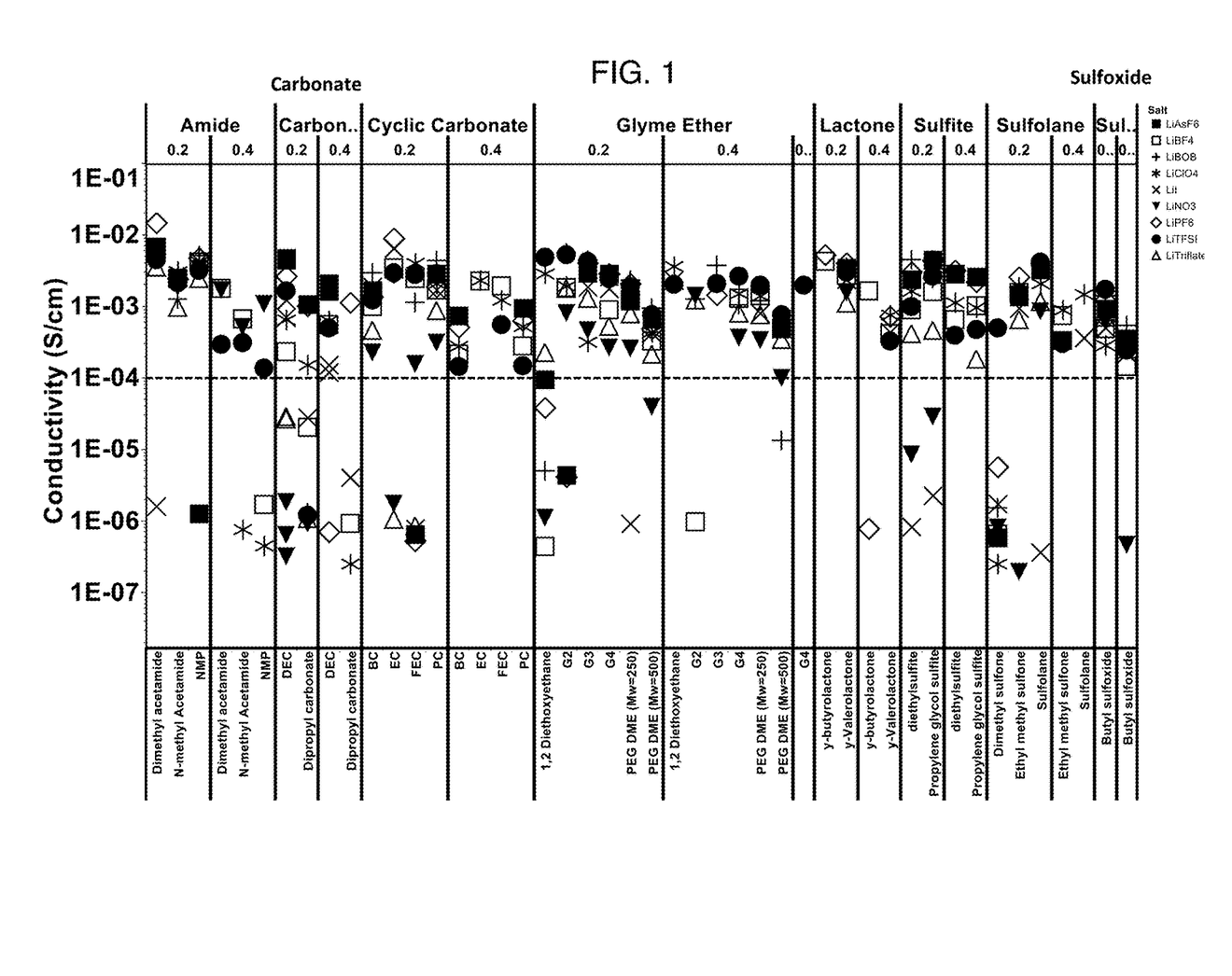
FIG. 1 illustrates the results of conductivity testing of a variety of electrolyte solutions formulated according to embodiments of the invention.

FIG. 1 illustrates the results of conductivity testing of a variety of formulations. The dashed line in the figure identifies the threshold conductivity for a desirable formulation. Several salts were tested (including lithium hexafluoroarsenate (LiAsF$_6$), lithium tetrafluoroborate (LiBF$_4$), lithium perchlorate (LiClO$_4$), lithium iodide (LiI), lithium hexafluorophosphate (LiPF$_6$), and lithium bis(trifluoromethane sulfonyl) imide (LiTFSI). Several solvents were tested, including several of those identified elsewhere herein. FIG. 1 also identifies families for the solvents on the top x-axis.

FIG. 1 illustrates the unpredictability of the salt and solvent combinations. For example, many of the solvents have data points both above and below the reference dashed line. The data points above the line can be related to the concentration of a salt, such as with the solvent N-methyl-2-pyrrolidone. In other cases, the identity of the salt influences the performance of the combination more than the identity of the salt, such as with dipropyl carbonate.

Figure 2A:
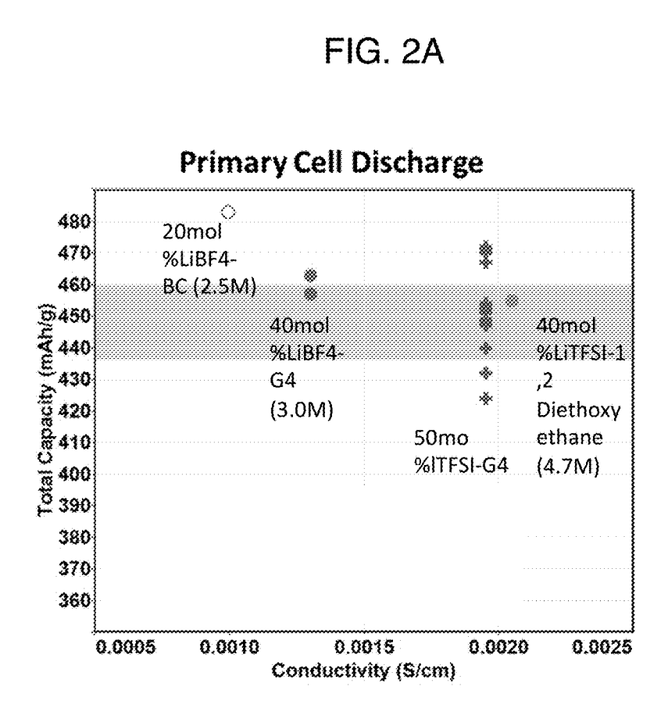
FIGS. 2A and 2B illustrate the primary battery performance and the secondary battery performance for three salt and solvent combinations compared to a control electrolyte formulation (banded area in the FIG. 2A).
Figure 2B:
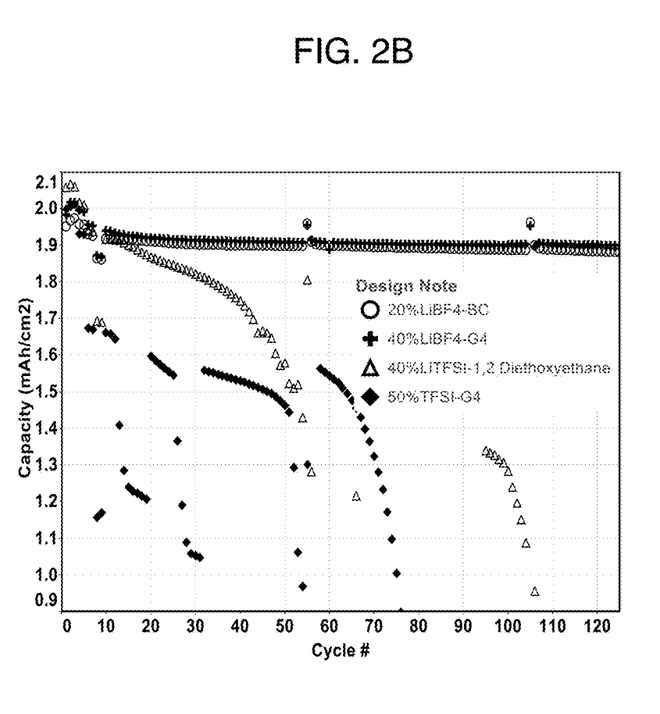

FIGS. 2A and 2B illustrate the primary battery performance and the secondary battery performance for three salt and solvent combinations: 40 Mole % lithium bis(trifluoromethane sulfonyl) imide in 1,2 diethoxyethane, 40 Mole % lithium tetrafluoroborate in tetraethylene glycol dimethyl ether, and 40 Mole % lithium tetrafluoroborate in BC. In parentheses next to each formulation is the molarity of the salt in the solvent, which is discussed in further detail below.

FIG. 2A illustrates the total capacity of a primary battery with a $CF_x$/SVO cathode and a lithium metal anode and one of the three tested electrolyte formulations (and a control formulation) plotted against the conductivity for each electrolyte formulations as measured in the conductivity test cell. The shaded area is one standard deviation about the control formulation. FIG. 2B illustrates cycle life (capacity versus cycle) for the same three tested electrolyte formulations and a control formulation in a battery having an LCO cathode and an LTO anode. The cells were cycled at a rate of C/5 with a constant voltage hold to C/100 current (charge only) between 1.8 V and 2.7V. The noisy data in the control plot demonstrates a lack of stability in the control, and the stability improves in the inventive formulations.

Figure 3:
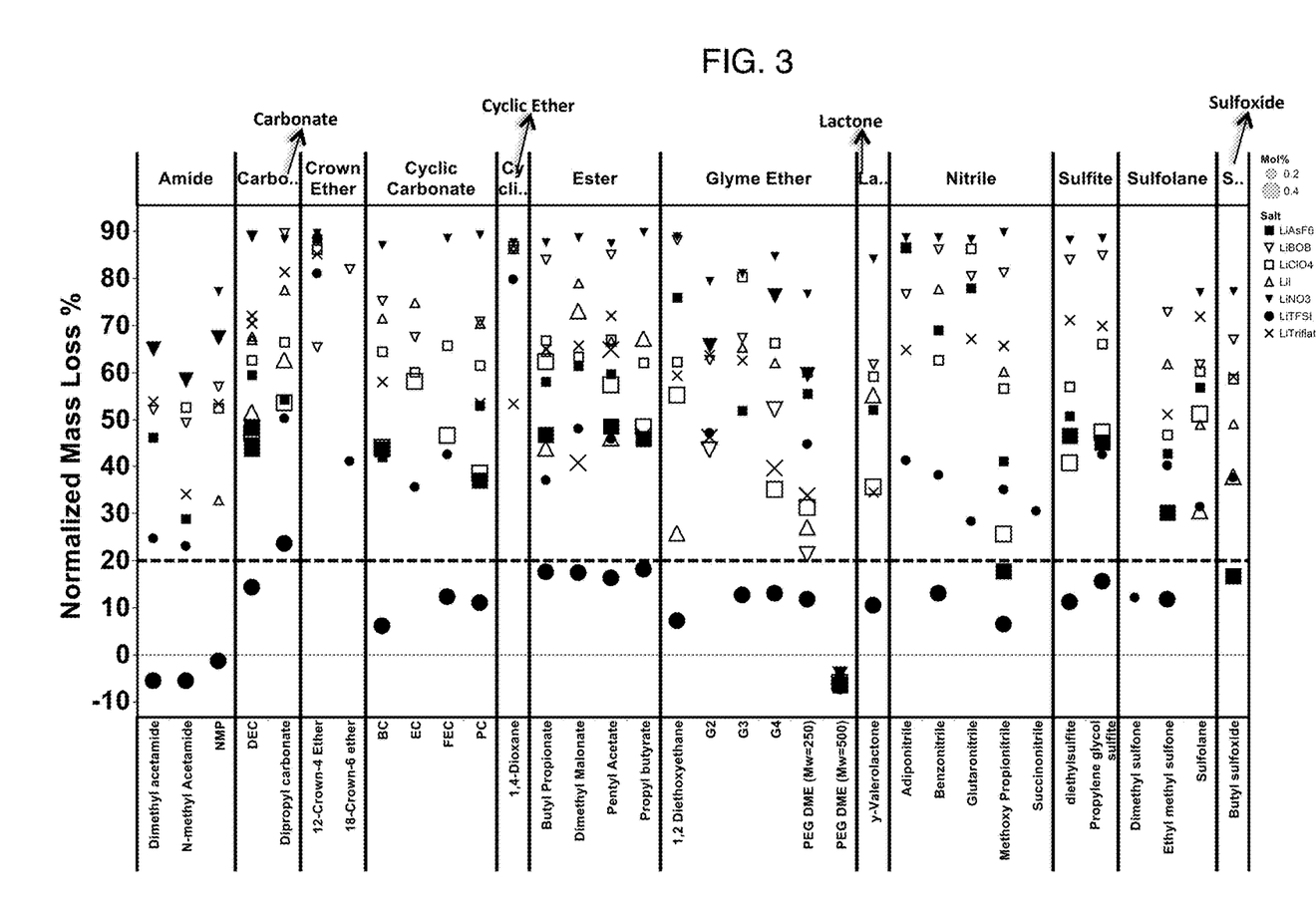
FIG. 3 illustrates normalized mass loss measurements after heating at 160 degrees Celsius for 4 hours under vacuum for a variety of electrolyte solutions formulated according to embodiments of the invention.

FIG. 3 illustrates normalized mass loss measurements for a variety of formulations after heating at 160 degrees Celsius for 4 hours under vacuum. The normalized mass loss (%) is calculated by the mass loss (%) of the formulation minus the mass loss (%) of 50% TFSI-G4. The dashed line in the figure (20% normalize mass loss) is used as a threshold for desirable formulations. Several salts were tested (including lithium hexafluoroarsenate ($LiAsF_6$), lithium bis(oxalato) borate (LiBOB), lithium perchlorate ($LiClO_4$), lithium iodide (LiI), lithium nitrate ($LiNO_3$), lithium bis(trifluoromethane sulfonyl) imide (LiTFSI), and lithium triflate. Several solvents were tested, including several of those identified elsewhere herein. FIG. 3 also identifies families for the solvents on the top x-axis. In FIG. 3, lower mass loss illustrates lower volatility, and only a few formulations demonstrated lower mass loss than the typical formulation.

Figure 4:
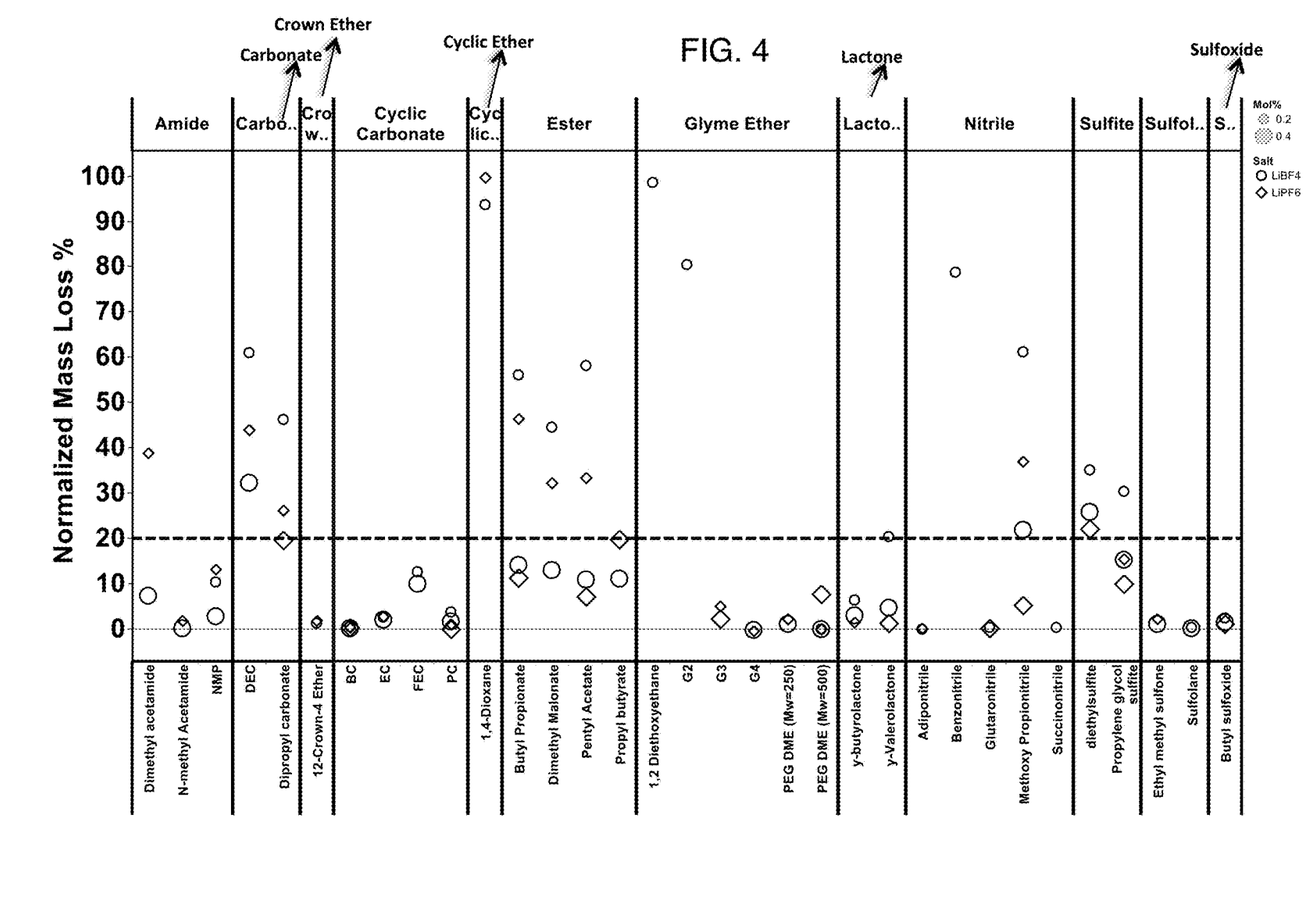
FIG. 4 illustrates normalized mass loss measurements after heating at 37 degrees Celsius for 4 hours under vacuum for a variety of electrolyte solutions formulated according to embodiments of the invention.

FIG. 4 illustrates normalized mass loss measurements for electrolyte formulations under vacuum at 37 degrees Celsius for 4 hours using the lithium salts lithium hexafluorophosphate and lithium tetrafluoroborate. The normalized mass loss (%) is calculated by the mass loss (%) of the formulation minus the mass loss (%) of 50% TFSI-G4. The dashed line in the figure (20% normalize mass loss) is used as a threshold for a desirable formulation. Many of the formulations in FIG. 4 demonstrated lower mass loss than the typical formulation.

Figure 5:
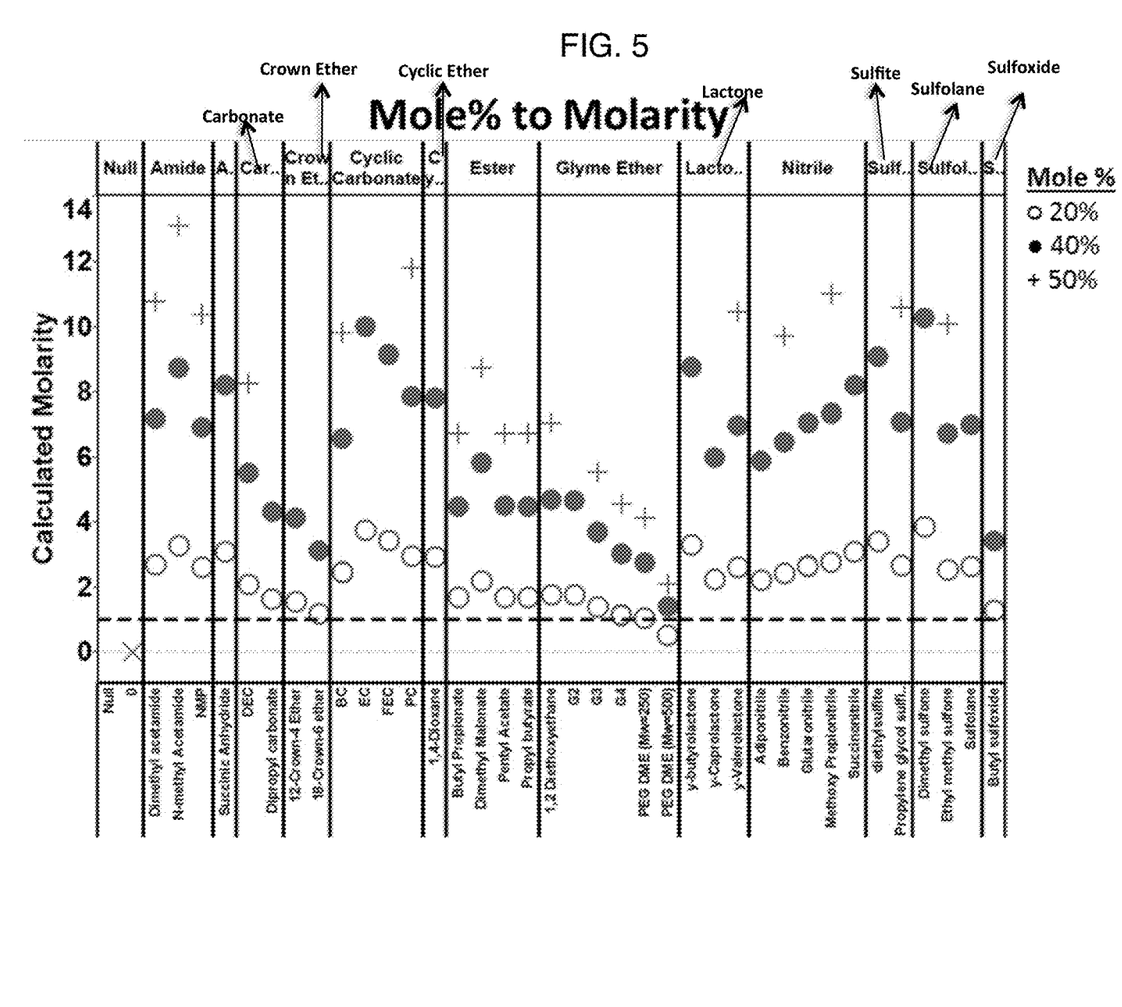
FIG. 5 illustrates the conversion of Mole % to molarity for a variety of electrolyte solutions formulated according to embodiments of the invention.

FIG. 5 illustrates the conversion of Mole % to molarity for a number of the solvents. FIG. 5 shows that the embodiments disclosed herein can have 2 to 14 times more salt than is typically used.

Unexpectedly, these high salt formulations have lower volatility than typical carbonate formulations and perform well with both primary and secondary battery chemistries. These high salt content formulations are unique as compared to typical electrolyte formulation, and different from other comparatively high salt electrolytes (such as in Suo, L. et at, *Nature Comm.* 4, 1481 (2013)).

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. An electrolyte for a battery, comprising:
an organic solvent and a lithium salt, wherein the lithium salt is mixed with the organic solvent at a concentration of at least 20 Mole % and the organic solvent comprises propylene glycol sulfite.

2. The electrolyte of claim 1 wherein the lithium salt comprises lithium bis(trifluoromethane sulfonyl) imide.

3. The electrolyte of claim 1 wherein the lithium salt comprises lithium tetrafluoroborate.

4. The electrolyte of claim 1 wherein the lithium salt comprises lithium hexafluorophosphate.

5. The electrolyte of claim 1 wherein the lithium salt is mixed with the organic solvent at a concentration of at least 55 Mole %.

6. The electrolyte of claim 1, wherein the concentration of the lithium salt mixed with the organic solvent is at least 40 Mole %.

7. A primary battery comprising:
a carbon fluoride—silver vanadium oxide hybrid composite cathode;
an anode; and
an electrolyte between the cathode and the anode, the electrolyte including an organic solvent and a lithium salt, wherein the lithium salt is mixed with the organic solvent at a concentration of at least 40 Mole % and the organic solvent comprises propylene glycol sulfite.

8. The primary battery of claim 7, wherein the lithium salt is mixed with the organic solvent at a concentration of at least 55 Mole %.

9. The primary battery of claim 7, wherein the anode comprises lithium.

10. The primary battery of claim 7, wherein the lithium salt comprises lithium bis(trifluoromethane sulfonyl) imide.

11. The primary battery of claim 7, wherein the lithium salt comprises lithium tetrafluoroborate.

12. The primary battery of claim 7, wherein the lithium salt comprises lithium hexafluorophosphate.

13. A battery comprising:
a cathode including one or more of a phosphate, a fluorophosphate, a fluorosulfate, a fluorosilicate, a spinel, a lithium metal silicate, a lithium metal phosphate, a metal fluoride, carbon fluoride, sulfur, a metal oxide, or a metal sulfide;
an anode; and
an electrolyte between the cathode and the anode, the electrolyte including an organic solvent and a lithium salt, wherein the lithium salt is mixed with the organic solvent at a concentration of at least 20 Mole % and the organic solvent comprises propylene glycol sulfite.

14. The battery of claim 13, wherein the cathode is a carbon fluoride silver vanadium oxide hybrid composite cathode.

15. The battery of claim 13, wherein the lithium salt comprises lithium bis(trifluoromethane sulfonyl) imide.

16. The battery of claim 13, wherein the lithium salt comprises lithium tetrafluoroborate.

17. The battery of claim 13, wherein the lithium salt comprises lithium hexafluorophosphate.

18. The battery of claim 13, wherein the concentration of the lithium salt mixed with the organic solvent is at least 40 Mole %.

19. The battery of claim 13, wherein the concentration of the lithium salt mixed with the organic solvent is at least 55 Mole %.

20. The battery of claim 13, wherein the anode comprises lithium.

* * * * *